US007281137B1

(12) United States Patent
Vitikainen

(10) Patent No.: US 7,281,137 B1
(45) Date of Patent: Oct. 9, 2007

(54) AUTHENTICATION METHOD AND SYSTEM

(75) Inventor: Timo Vitikainen, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/018,503

(22) PCT Filed: Jul. 2, 1999

(86) PCT No.: PCT/EP99/04625

§ 371 (c)(1),
(2), (4) Date: Apr. 4, 2002

(87) PCT Pub. No.: WO01/03402

PCT Pub. Date: Jan. 11, 2001

(51) Int. Cl.
*H04L 9/32* (2006.01)
(52) U.S. Cl. .................................. 713/189; 380/250
(58) Field of Classification Search ............... 713/189; 380/250
See application file for complete search history.

(56) References Cited

U.S. PATENT DOCUMENTS

| 5,898,922 | A  | * | 4/1999  | Reininghaus ............... 455/433 |
| 6,301,471 | B1 | * | 10/2001 | Dahm et al. ................ 455/405 |
| 6,377,982 | B1 | * | 4/2002  | Rai et al. .................... 709/217 |
| 6,469,998 | B1 | * | 10/2002 | Burgaleta Salinas et al. ........................ 370/338 |
| 6,587,684 | B1 | * | 7/2003  | Hsu et al. .................... 455/419 |
| 6,608,832 | B2 | * | 8/2003  | Forslow ....................... 370/353 |
| 6,611,516 | B1 | * | 8/2003  | Pirkola et al. ............... 370/352 |
| 6,636,502 | B1 | * | 10/2003 | Lager et al. ................. 370/352 |
| 6,842,462 | B1 | * | 1/2005  | Ramjee et al. .............. 370/466 |
| 6,847,633 | B1 | * | 1/2005  | Ryu et al. .................... 370/352 |
| 6,898,433 | B1 | * | 5/2005  | Rajaniemi et al. ......... 433/456.1 |

FOREIGN PATENT DOCUMENTS

| GB | 2 280 085 A | * | 1/1995 |
| JP | 09114891    | * | 10/1995 |

(Continued)

OTHER PUBLICATIONS

H. Eda, et al., "Sure Identification of Individual Terminals in Terms of Their Identification Number and with the Aid of Authentication Circuits", Nikkei Electronics, 1999, 4,5., No. 740 pp. 1-3 of the English translation submitted by applicant.*

(Continued)

*Primary Examiner*—Nasser Moazzami
*Assistant Examiner*—Eleni Shiferaw
(74) *Attorney, Agent, or Firm*—Squire, Sanders & Dempsey, L.L.P.

(57) ABSTRACT

The present invention relates to an authentication method and system for identifying a subscriber (1) of a first network an address of the second network (9) is allocated to the subscriber (1). An information about a mapping between the address of the second network (9) and a subscriber identity is generated and transmitted to the second network (9). Thereby, an authentication server connection is provided between the first network (2) and the second network (9), such that the subscriber identity can be handled over to the second network (9). Thus, a VAS platform of the second network (9) can receive the address of the second network and the subscriber identity of the subscriber (1), such that subscriber accessing services of the VAS platform can be identified for charging and/or addressing purposes.

44 Claims, 2 Drawing Sheets

FOREIGN PATENT DOCUMENTS

| | | |
|---|---|---|
| JP | 09-114891 | 5/1997 |
| WO | WO95/32592 | 11/1995 |

OTHER PUBLICATIONS

H. Eda, et al., "Sure Identification of Indvidual Terminals in Terms of Their Identification Number and with the Aid of Authentication Circuits", Nikkei Electronics, 1999, 4, 5., No. 740 pp. 1-3 of the English translation submitted by applicant.*

Ashley, et al. "wired versus wireless security: the internet, WAP and iMode for E-commerce" Dec. 10-14, 2001.*

H. Eda, et al., "Sure Identification of Individual Terminals in Terms of Their Identification Number and with the Aid of Authentication Circuits", Nikkei Electronics, 1999, 4,5., No. 740, pp. 105-113.

Translation of a Japanese Examination Report issued Apr. 26, 2005 in JP 2001-508140.

Office Action dated Dec. 5, 2005 in corresponding Japanese Application No. 2001-508140.

Edogawa, Tech Ranger File No. 41, "New Mobile Telephone for On-Line Information Terminal"; DOS/V magazine, Mar. 1, 1999, Softbank K.K., vol. 8, No. 5, pp. 238-241, Fig. 1.

\* cited by examiner

AUTHENTICATION METHOD AND SYSTEM

PRIORITY CLAIM

This is a national stage of PCT application No. PCT/EP99/04625, filed on Jul. 2, 1999. Priority is claimed on that application.

FIELD OF THE INVENTION

The present invention relates to an authentication method and system for identifying a subscriber of a first network in a second network.

BACKGROUND OF THE INVENTION

In a GPRS (General Packet Radio Services) system, a packet mode technique is used to transfer high-speed and low-speed data and signaling in an efficient manner. GPRS optimizes the use of network and radio resources. Applications based on standard data protocols are supported, and interworking is defined with IP-networks. GPRS is designed to support from intermittent and bursty data transfers through to occasional transmission of large volumes of data. Charging is typically based on the amount of data transferred.

GPRS introduces two new network nodes in the GSM mobile network. The Serving GPRS Support Node (SGSN) which is at the same hierarchical level as a mobile switching center (MSC) and which keeps track of the individual location of mobile stations (MS) and performs security functions and access control. The SGSN is connected to the base station system with a Frame Relay. The Gateway GSN (GGSN) provides interworking with external packet-switched networks, and is connected with SGSNs via an IP-based GPRS backbone network. A HLR (Home Location Register) of the GSM system is enhanced with GPRS subscriber information, and a VLR (Visitor Location Register) can be enhanced for more efficient coordination of GPRS and non-GPRS services and functionality, e.g. paging for circuit switched calls that can be performed more efficiently via the SGSN, and combined GPRS and non-GPRS location updates.

In order to access the GPRS services, an MS first makes its presence known to the network by performing a GPRS attach. This operation establishes a logical link between the MS and SGSN, and makes the MS available for paging via the SGSN, and notification of incoming GPRS data. In order to send and receive GPRS data, the MS shall activate the packet data address it wants to use. This operation makes the MS known in the corresponding GGSN and interworking with external data networks can commence. User data is transferred transparently between the MS and the external data networks with a method known as capsulating and tunneling, wherein data packets are equipped with GPRS-specific protocol information and transferred between the MS and the GGSN. This transparent transfer method lessens the requirement for the GPRS mobile network to interpret external data protocols, and it enables easy introduction of additional interworking protocols in the future.

In case a mobile subscriber wishes to access a value added service (VAS) provided by an IP network, a service specific charging is a mandatory feature of the corresponding VAS platform for mobile operators. This means that operators need service platforms which are capable of performing charging based on e.g. an accessed WML content or URL (Uniform Resource Locator) and delivered messages. However, MS identification in VAS platforms connected to the GPRS network or other mobile packet switched networks is not trivial. The reason therefore is that a VAS platform receives only IP packets from a certain source address which is normally only a dynamic IP address of an MS and thus not sufficient at all for identifying that MS.

Furthermore, an MSISDN (Mobile Station ISDN number) is required which is especially important for messaging services (e.g. multimedia messaging) in order to prevent additional HLR queries.

A known MS identification is performed e.g. by using user names, passwords or cryptographic keys. However, these types of solutions are complex to operate/manage for mobile operators. Moreover, such solutions normally require their own management systems and data bases which are not necessarily consistent with existing billing or charging systems of mobile operators where the IMSI (International Mobile Subscriber Identity) or the MSIDSN are the key of the CDRs (Call Detail Records).

Alternatively, an authentication service could be performed in the HLR. However, this solution leads to a significant rise of the load in the HLR which is already a crucial node.

SUMMARY OF THE INVENTION

It is therefore an object of the present invention to provide an authentication method and system, by means of which VAS platforms may identify an MS accessing services of the VAS platform.

This object is achieved by an authentication method for identifying a subscriber of a first network in a second network, comprising the steps of: allocating an address of said second network to said subscriber; generating information about a mapping between the subscriber's address in said second network and a subscriber identity; and transmitting the mapping to said second network.

Furthermore, the above object is achieved by Authentication system for identifying a subscriber of a first network in a second network, comprising:

a gateway device comprising allocation means for allocating an address of said second network to said subscriber, and authentication client means for generating an information about a mapping between said address of said second network and a subscriber identity, and for transmitting said mapping information to said second network; and an authentication server provided in said second network and adapted to log and maintain said mapping information.

Furthermore, the above object is achieved by a gateway device for connecting a first network to a second network, comprising:

allocation means for allocating an address of said second network to a subscriber of said first network; and authentication client means for generating an information about a mapping between said address of said second network and a subscriber identity, and for transmitting said mapping information to said IP network.

Accordingly, a mapping information between the address of the second network and the subscriber identity is generated and supplied to the second network. Thereby, a client-server connection is achieved, which allows the actual subscriber identity of a dynamic address of the second network to be handled over to the second network. The second network uses the mapping of the address of the second network and the subscriber identity for identifying the subscriber.

Since the first network, e.g. the GGSN, includes an information about the mapping between the address of the second network and the subscriber identity, new mapping data can be transmitted to the second network, if the mapping has changed.

Preferably, the subscriber identity is the IMSI and/or the MSISDN of the subscriber. Thereby, a multimedia messaging service may identify the recipient using the MSISDN, and the recipient may identify the message sender based on the MSISDN provided by the multimedia messaging service center, such that HLR queries are no longer required. Furthermore, the MSISDN or IMSI may be used by a charging function for identifying the subscriber in order to perform a service specific charging.

The mapping information may be transmitted in an access request message, such as a RADIUS access request message.

Preferably, an authentication server functionality may be provided for a VAS platform, wherein the access request message is transmitted to the authentication server functionality of the VAS platform, and the mobile terminal is identified in the VAS platform based on the mapping information. In this case, the authentication server functionality may be included in the VAS platform or, alternatively, the authentication server functionality may be provided by a dedicated authentication server.

In case the gateway device is a GGSN, the mapping information may be generated by an authentication client functionality in the GGSN.

The mapping information may be used for a service specific charging.

The authentication server may be a RADIUS server for the VAS platform provided in the second network, wherein the VAS platform is adapted to identify the subscriber based on the mapping information.

BRIEF DESCRIPTION OF THE DRAWINGS

In the following, the present invention will be described in greater detail on the basis of a preferred embodiment with reference to the accompanying drawings, in which.

DESCRIPTION OF THE PREFERRED EMBODIMENT

In the following, the preferred embodiment of the authentication method and system according to the present invention will be described on the basis of a GPRS network which is an example for a first network and an IP network which is an example for a second network.

Figure 1:
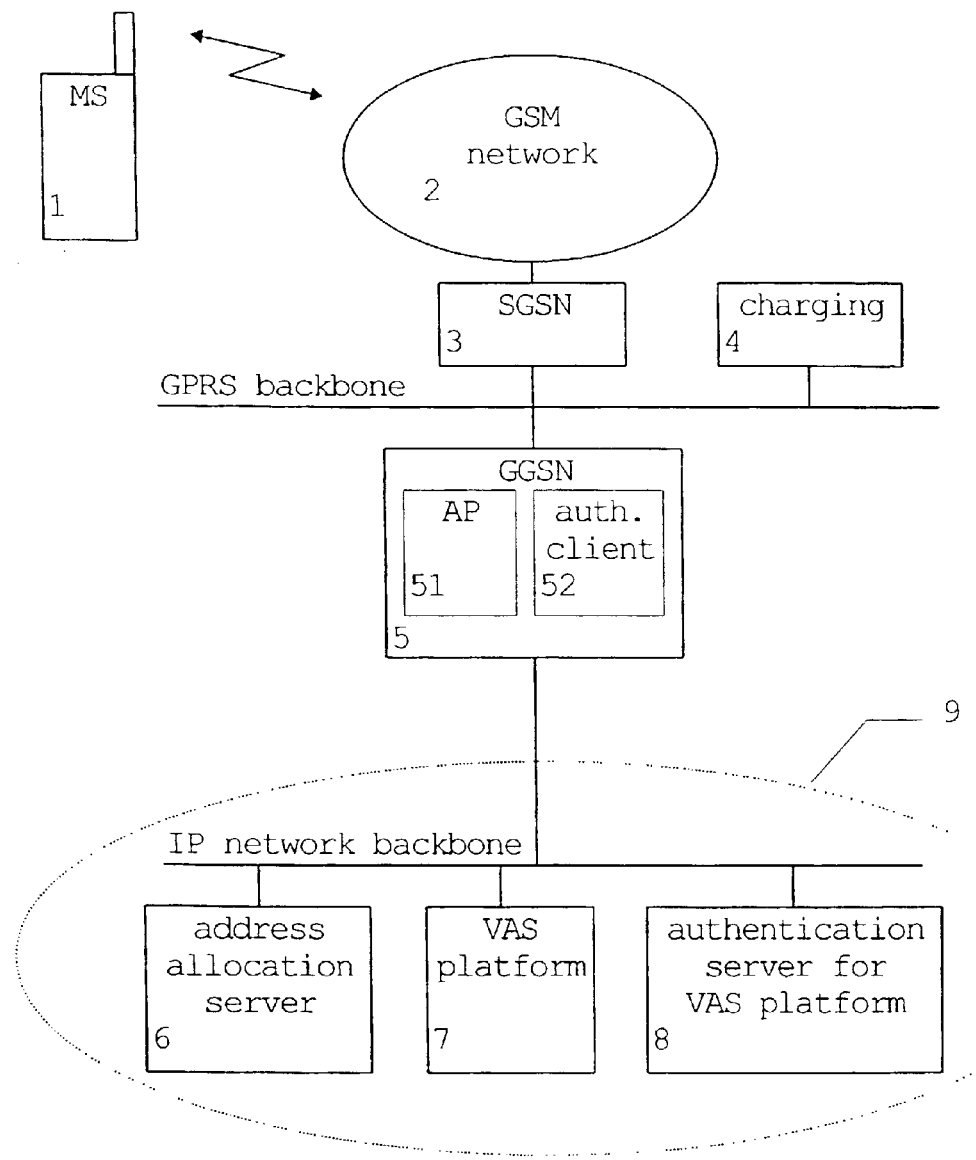
FIG. 1 shows a block diagram of a GPRS network connected to an IP network according to the preferred embodiment of the present invention.

According to FIG. 1, a mobile terminal or mobile station (MS) 1 is radio-connected to a GSM network 2 which in turn is connected to an SGSN 3 of a GPRS backbone network. The GPRS backbone network includes a charging server 4 and a GGSN 5 connected to an IP network 9, e.g. an intranet of a specific operator or the Internet.

The GGSN 5 comprises an access point unit (AP) 51 which provides an access to the IP network 9 and which is arranged to allocate an IP address to an MS to be connected to the IP network 9. Furthermore, the GGSN 5 includes an authentication client unit 52 adapted to provide required parameters for an access request issued to the IP network 9. Moreover, the authentication client unit 52 may be arranged to clarify/specify the handling of user name and password parameters supplied to the desired VAS of the IP network 9.

According to an example of the preferred embodiment shown in FIG. 1, the IP network 9 is an operator's intranet backbone which comprises an address allocation server 6, e.g. a RADIUS (Remote Authentication Dial In User Service) server, a DHCP (Dynamic Host Configuration Protocol) server or a DNS (Domain Name Server), or the like. The address allocation server 6 is arranged to respond to an access request from the GGSN 5 with either an access-accept or an access-reject message. Furthermore, the address allocation server 6 performs a host configuration and address allocation in the IP network 9.

Additionally, the IP network 9, e.g. the operator's intranet, comprises a Value Added Service (VAS) platform 7. An example for such a VAS platform may be a Multimedia Messaging Center (MMSC) for delivering multimedia messages to requesting subscribers such as the MS 1. Moreover, another example for a VAS platform is a Wireless Application Protocol (WAP) gateway which provides an access to the World Wide Web (WWW) based on a corresponding Uniform Resource Locator (URL).

According to the preferred embodiment of the present invention, a dedicated authentication server 8 for the VAS platform 7 is provided in the IP network 9. The authentication server 8 may be a RADIUS server which accepts or rejects access requests to the VAS platform 7. Furthermore, the authentication server 8 is arranged to log or store an access request or a corresponding mobile subscriber identity, received from the authentication client, e.g. RADIUS client, 52 of the GGSN 5. Accordingly, the authentication client 52 of the GGSN 5 communicates with the address allocation server or specific authentication server 8, such that an authentication client-server connection is established.

In particular, the authentication client 52 incorporates or adds a mapping information to the access request, based on which the actual MSISDN and/or IMSI of an MS requesting a service from the IP network 9 can be derived at the authentication server 8. The mapping information may comprise the current IP address, the MSISDN and/or the IMSI, or any combination or shortened version, based on which the MSISDN and/or IMSI can be derived from the current IP address. The MSISDN can be obtained by the GGSN 5 via the SGSN 3 from GSM network 2.

Thus, the authentication client unit 52 of the GGSN 5 provides an information about the mapping between the IP address and the MSISDN and/or the IMSI. If this mapping is changed, the authentication client unit 52 sends a new mapping information to the authentication server 8 of the IP network 9. Thereby, the MSISDN and/or IMSI is always available to the VAS platform 7.

The MSISDN can be provided as an additional GTP parameter supplied from the SGSN 3 to the GGSN 5. The IMSI can be derived from the TID also supplied from the SGSN 3 to the GGSN 5.

The GGSN 5 functions as an access point of the GSM GPRS data network for interworking with the IP network 9. In this case, the GPRS network will look like any other IP network or subnetwork. The access to the IP network 9 may involve specific functions such as user authentication, users authorization, end-to-end encryption between an MS and the IP network 9, allocation of a dynamic IP address belonging to the addressing space of the IP network 9. In case of a non-transparent access to the IP network 9, the GGSN 5 takes part in the functions listed above. In particular, the MS 1 requesting access to the IP network 9 is given an address belonging to the operator addressing space. The address is given either at subscription, in which case it is a static address, or at PDP (Packet Data Protocol) context activation, in which case it is a dynamic address. This address is used for packet forwarding between the IP network 9 and the GGSN 5 and within the GGSN 5.

In the following, an example for an access operation to the IP network 9 via the GPRS backbone network is described based on FIG. 2.

Figure 2:
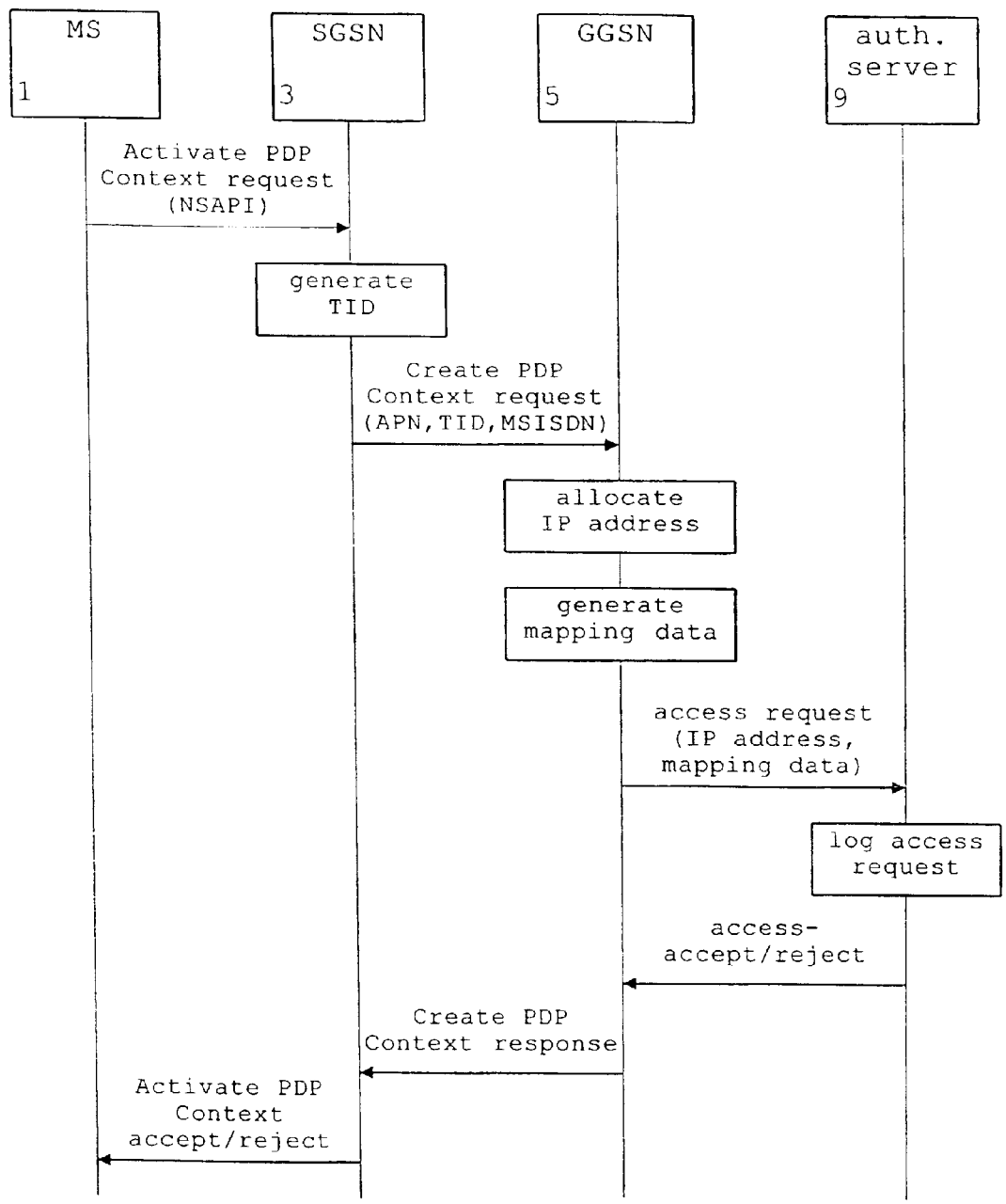
FIG. 2 shows an information flow and processing diagram of an access operation to the IP network, according to the preferred embodiment of the present invention.

FIG. 2 shows an information flow and processing diagram indicating the signaling and processing actions performed during the exemplary access operation. According to FIG. 2, the MS 1 sends an Activate PDP Context Request message to the SGSN 3, including protocol configuration options and parameters such as an NSAPI (Network layer Service Access Point Identifier). Then, the SGSN 3 creates a TID for the requested PDP context by combining the IMSI stored in the MM (Mobility Management) context with the MSAPI received from the MS, wherein the SGSN fetches the MSISDN from the HLR. Subsequently, the SGSN 3 transmits a Create PDP Context Request message to the GGSN 5 including parameters such as an APN (Access Point Name), the TID and the MSISDN. The AP unit 51 of the GGSN 5 allocates an IP address for the MS 1, and the authentication client unit 52 incorporates required parameters for the access request to the authentication server 8. In particular, the authentication client unit 52 generates mapping data indicating a mapping between the allocated IP address and the MSISDN/IMSI.

The GGSN 5 sends the access request including the IP address and the mapping data to the authentication server 8 provided for the VAS platform 7. Then, the authentication server 8 accepts or rejects the received request. Furthermore, the authentication server 8 logs the request including the IP address and the mapping data. Accordingly, the VAS platform 7 is capable of identifying the MS 1 based on the mapping data included in the access request stored in the authentication server 8.

The GGSN 5 sends back to the SGSN 3 a Create PDP Context Response message, wherein a cause value is set according to the result of the authentication, i.e. access rejected or accepted. Depending on the cause value received in the Create PDP Context Response message, the SGSN 3 sends either an Activate PDP Context Accept message or an Activate PDP Context Reject message to the MS 1.

Accordingly, by the above access procedure, the VAS platform 7 can receive the IP address, the IMSI and the MSISDN of an accessing MS, such that the addressing in the multimedia messaging service can be based on the MSISDN and service specific charging is possible.

In summary, the present invention relates to an authentication method and system for identifying a subscriber of a first network in a second network, wherein an address of the second network is allocated to the subscriber. An information about a mapping between the address of the second network and a subscriber identity is generated and transmitted to the second network. Thereby, an authentication server connection is provided between the first network and the second network, such that the subscriber identity can be handled over to the second network. Thus, a VAS platform of the second network can receive the address of the second network and the subscriber identity of the subscriber, such that subscriber accessing services of the VAS platform can be identified for charging and/or addressing purposes.

It is to be noted that the above described authentication method and system can be applied between any gateway device between two networks, such as a mobile network and an IP network, or a telephone network (e.g., ISDN, PSTN) and a closed or open data network. Moreover, the authentication server 8 and authentication client unit 52 are not restricted to a RADIUS server and client. It is also to be noted that multiple VAS platforms, similar to or different from each other, can be attached to the second network at the same time.

The above description of the preferred embodiment and the accompanying drawings are only intended to illustrate the present invention. The preferred embodiment of the invention may thus vary within the scope of the attaches claims.

The invention claimed is:

1. An authentication method for identifying a subscriber of a first network in a second network, comprising:
   accessing a value added service platform in the second network being an internet protocol network from the first network being a general package radio services network by a terminal of the subscriber;
   allocating an Internet protocol (IP) address of said second network to said subscriber;
   generating information about a mapping between the subscriber's IP address in said second network and a subscriber identity; and
   transmitting the mapping to said second network,
   wherein said subscriber is identified in said value added service platform based on said mapping information.

2. The authentication method according to claim 1, wherein said mapping information is transmitted to said second network, when said mapping between said Internet protocol address in said second network and the subscriber identity has changed.

3. The authentication method according to claim 2, wherein said subscriber identity is at least one of an international mobile subscriber identity and a mobile station integrated services digital network number of the subscriber.

4. The authentication method according to claim 2, wherein said mapping information is transmitted in an access request message.

5. The authentication method according to claim 2, wherein said mapping information is generated by an authentication client functionality in a gateway general packet radio services support node.

6. The authentication method according to claim 2, wherein said mapping information is used for at least one of a service specific charging and addressing of mobile terminals.

7. The authentication method according to claim 1, wherein said subscriber identity is at least one of an international mobile subscriber identity and mobile station integrated services digital network number of the subscriber.

8. The authentication method according to claim 7, wherein said mapping information is transmitted in an access request message.

9. The authentication method according to claim 7, wherein said mapping information is generated by an authentication client functionality in a gateway general packet radio services support node.

10. The authentication method according to claim 7, wherein said mapping information is used for at least one of a service specific charging and addressing of mobile terminals.

11. The authentication method according to claim 1, wherein said mapping information is transmitted in an access request message.

12. The authentication method according to claim 11, wherein said request access message is a remote authentication dial in user service access request message.

13. The authentication method according to claim 12, wherein said mapping information is generated by an authentication client functionality in a gateway general packet radio services support node.

14. The authentication method according to claim 12, wherein said mapping information is used for at least one of a service specific charging and addressing of mobile terminals.

15. The authentication method according to claim 11, wherein said mapping information is generated by an authentication client functionality in a gateway general packet radio services support node.

16. The authentication method according to claim 11, wherein said mapping information is used for at least one of a service specific charging and addressing of mobile terminals.

17. The authentication method according to claim 1, wherein said authentication server functionality is included in the value added service platform.

18. The authentication method according to claim 17, wherein said mapping information is generated by an authentication client functionality in a gateway general packet radio services support node.

19. The authentication method according to claim 17, wherein said mapping information is used for at least one of a service specific charging and addressing of mobile terminals.

20. The authentication method according to claim 1, wherein said authentication server functionality is provided by a dedicated authentication server.

21. The authentication method according to claim 20, wherein said mapping information is generated by an authentication client functionality in a gateway general packet radio services support node.

22. The authentication method according to claim 20, wherein said mapping information is used for at least one of a service specific charging and addressing of mobile terminals.

23. The authentication method according to claim 1, wherein said mapping information is generated by an authentication client functionality in a general packet radio services support node.

24. The authentication method according to claim 23, wherein said mapping information is used for at least one of a service specific charging and addressing of mobile terminals.

25. The authentication method according to claim 1, wherein said mapping information is used for at least one of a service specific charging and addressing of mobile terminals.

26. An authentication system for identifying a subscriber of a first network a second network, comprising:
a terminal of the subscriber configured to access a value added service platform in the second network being an internet protocol network from the first network being a general packet radio services network by said terminal of the subscriber;
a gateway device comprising allocation means for allocating an Internet protocol address of said second network to said subscriber, and authentication client means for generating an information about a mapping between said Internet protocol address of said second network and a subscribe identity, and for transmitting said mapping information to said second network; and
an authentication server provided in said second network and configured to log and maintain said mapping information,
wherein said authentication server is a server for said value added service platform provided in said second network, wherein said value added service platform is configured to identify said subscriber based on said mapping information.

27. The authentication system according to claim 26, wherein said gateway device is a general packet radio services support node.

28. The authentication system according to claim 27, wherein said authentication client means is a remote authentication dial in user service client.

29. The authentication system according to claim 27, wherein said server is a remote authentication dial in user service server.

30. The authentication system according to claim 27, wherein said subscriber identity is an international mobile subscriber identity or a mobile station integrated services digital network number.

31. The authentication system according to claim 27, wherein said authentication client means is arranged to transmit said mapping information in an access request message to said authentication server.

32. The authentication system according to claim 26, wherein said authentication client means is a remote authentication dial in user service client.

33. The authentication system according to claim 32, wherein said server is a remote authentication dial in user service server.

34. The authentication system according to claim 32, wherein said subscriber identity is an international mobile subscriber identity or a mobile station integrated services digital network number.

35. The authentication system according to claim 32, wherein said authentication client means is arranged to transmit said mapping information in an access request message to said authentication server.

36. The authentication system according to claim 26, wherein said server is a remote authentication dial in user service server.

37. The authentication system according to claim 36, wherein said subscriber identity is an international mobile subscriber identity or a mobile station integrated services digital network number.

38. The authentication system according to claim 36, wherein said authentication client means is arranged to transmit said mapping information in an access request message to said authentication server.

39. The authentication system according to claim 26, wherein said subscriber identity is an international mobile subscriber identity or a mobile station integrated service digital number.

40. The authentication system according to claim 39, wherein said authentication client means is arranged to transmit said mapping information in an access request message to said authentication server.

41. The authentication system according to claim 26, wherein said authentication client means is arranged to transmit said mapping information in an access request message to said authentication server.

42. A gateway device for connecting a first network to a second network, comprising:
- an allocation unit configured to allocate an Internet protocol address of said second network to a subscriber of said first network, wherein a terminal of the subscriber is configured to access a value added service platform in the second network being an internet protocol network from the first network being a general packet radio services network; and
- an authentication client unit configured to generate information about a mapping between said Internet protocol address of said second network and a subscriber identity, and to transmit said mapping information to said Internet protocol network, wherein said authentication client unit is a remote authentication dial in user service client.

43. The gateway device according to claim 42, wherein said authentication unit is configured to transmit said mapping information in an access request message.

44. A device configured to connect a first network comprising a general packet radio services network to a second network comprising an Internet protocol network, comprising:
- means for allocating an Internet protocol address of said second network to a subscriber of said first network, wherein a terminal of the subscriber comprises means for accessing a value added service platform in the second network being an internet protocol network from the first network being a general packet radio services network; and
- means for generating information about a mapping between said Internet protocol address of said second network and a subscriber identity, and for transmitting said mapping information to said Internet protocol network, wherein said authentication client means is a remote authentication dial in user service client.

* * * * *